United States Patent [19]

Graves et al.

[11] Patent Number: 4,528,550

[45] Date of Patent: Jul. 9, 1985

[54] METHOD AND APPARATUS FOR CODE CONVERSION OF BINARY OF MULTILEVEL SIGNALS

[75] Inventors: Alan F. Graves, Sherwood Park; James E. Dilley, Kanata, both of Canada

[73] Assignee: Northern Telecom Limited, Montreal, Canada

[21] Appl. No.: 546,877

[22] Filed: Oct. 31, 1983

[51] Int. Cl.³ .................................. H03K 13/24
[52] U.S. Cl. .................... 340/347 DD; 375/17; 375/19; 375/20
[58] Field of Search ............ 340/347 DD; 375/17–20, 375/60

[56] References Cited

U.S. PATENT DOCUMENTS

| | | |
|---|---|---|
| 3,457,510 | 7/1969 | Lender .................................. 375/60 |
| 3,753,113 | 8/1973 | Maruta et al. ........... 340/347 DD X |
| 3,754,237 | 8/1973 | de Laage de Meux ..... 340/347 DD |
| 3,760,277 | 9/1973 | Whang .................... 375/20 |
| 3,828,346 | 8/1974 | Forster et al. ............... 375/19 |
| 4,408,189 | 10/1983 | Betts et al. ............ 340/347 DD |
| 4,463,342 | 7/1984 | Langdon et al. ........... 340/347 DD |

Primary Examiner—B. Dobeck

[57] ABSTRACT

Apparatus for converting binary to quaternary-level signals in which the symbols of selected words are inverted in order to eliminate the d-c component of the signal. In order to reduce the power spectral density at frequencies close to d-c and increase the power spectral density at frequencies close to the Nyquist rate, one word of each frame is selectively inverted relative to another in order to maximize the summation of all the numerical values of the differences between adjacent symbol levels. Thereafter both words of the frame are selectively inverted in order to minimize the running digital sum of the signal.

2 Claims, 4 Drawing Figures

METHOD AND APPARATUS FOR CODE CONVERSION OF BINARY OF MULTILEVEL SIGNALS

This invention relates to a digital transmission system and more particularly to a method and apparatus for converting a binary signal to a highly efficient multilevel signal which has no power at zero frequency and twice the Nyquist rate, a small component of power at low frequencies, and a substantial component at the Nyquist rate. These factors facilitate transmission over telephone lines with a-c coupled amplifiers and the recovery of the timing information.

BACKGROUND OF THE INVENTION

In the digital transmission of binary information, the signals are generally converted to multilevel signals prior to transmission. The particular coding of the multilevel signal has a direct bearing on the bandwidth compression, the transmission efficiency, the cost and complexity of the equipment, the error performance and the difficulty of extracting clock or timing information.

For maximum efficiency, the multilevel symbol rate should be inversely proportional to the number of levels of the two signals. Thus, a 100% efficient quaternary code has a symbol rate equal to one-half the binary bit rate. If block mapping codes are used small coding blocks must be used during code conversion to reduce the complexity. In addition, the running digital sum of the transmitted signal should be constrained so that there is no d-c component, otherwise d-c restoration techniques will be required. The low frequency power of the transmitted signal should also be small in order that small components (particularly small coupling transformers) may be used throughout the system and to minimize the effects of impulse noise. To permit simple clock extraction from the received signal, it is desirable that the spectral energy of the transmitted code be non-zero at the Nyquist rate and zero at twice the Nyquist rate. In addition, the transmitted code must contain sufficient framing and error checking information to function correctly in the transmission system irrespective of the input bit sequence.

U.S. Pat. No. 3,753,113 entitled "Multilevel Code Signal Transmission System" issued Aug. 14, 1973 to Rikio Maruta et al, describes a system for transmitting multidigit words that include one digit (or symbol) which represents m-1 binary bits, as well as polarity inversion and synchronization information. The latter can be detected because one level (in this case the zero level) is a forbidden level and does not occur in this digit.

An entirely different approach is described in U.S. Pat. No. 3,754,237 entitled "Communication System Using Binary To Multilevel And Multilevel To Binary Coded Pulse Conversion" issued Aug. 21, 1973 to Patrick de Laage de Meux. In this system the binary signal is divided into words of n bits to which an (n+1)th bit of constant value is added before coding to a multilevel signal. The (n+1) bit words are then subdivided into partial words, each of which is translated into a multilevel pulse of one or the other polarity in order to constrain the running digital sum of the multilevel signal and hence eliminate the d-c component. Since the (n+1)th bit of each partial word is also inverted, this information can be utilized to correctly reconstruct the original word in the receiver. Also with this scheme, there is spectral energy at the Nyquist rate and none at twice the Nyquist rate thereby facilitating clock recovery. However, to obtain synchronization, an additional synchronization word is transmitted at periodic intervals. This synchronization word reduces the coding efficiency of this coding scheme over that which is obtained by adding only the (n+1)th bit of constant value to each word.

The related patent by Betts et al identified above described a split-block encoder in which an additional separate multilevel symbol is added to each group of words (which in itself does not include any binary signal information). This additional symbol is used to reconstruct the correct polarity of the original words in each frame, and in conjunction with the words to directly derive the block synchronization and framing information without the inclusion of a separate synchronization or framing word, thereby increasing the overall efficiency of the digital transmission system. Although this system exhibits a d-c null, there is still substantial energies at frequencies close to d-c. Because of the variable cable characteristics at low frequencies, it is desirable to utilize high-pass filtering to eliminate the signal components in this portion of the band. This filtering exacerbates the performance due to the rejected signal energy and hence there is a requirement for low spectral energy at low frequencies.

STATEMENT OF THE INVENTION

It has been discovered that a further reduction in the power spectral density at frequencies close to d-c and an increase in the power spectral density at frequencies close to the Nyquist rate, thereby increasing the energy available for clock extraction, can be achieved over that obtained by the Betts et al system, by modifying the criteria for selectively inverting the words. Thus the improvement is achieved by interleaving the symbols of the words of the block and selectively inverting one word relative to another to maximize the transition state sum (TSS, i.e. the summation of all the numerical values of the differences between adjacent symbol levels) of all words of each frame. Additionally, the frames are then selectively inverted to minimize the accumulated running digital sum of all previous frames and the selected frame.

BRIEF DESCRIPTION OF THE DRAWINGS

An example embodiment of the invention will now be described with reference to the accompanying drawings in which.

DESCRIPTION OF THE PREFERRED EMBODIMENT

The class of code described in the following example of binary to quaternary-level symbol conversion, is of the general form $2nB/(n+1)Q$, where:
  n is an integer,
  B=number of binary bits/frame, and Q = number of quaternary symbols/frame.

The selection of n has a direct bearing on such factors as:

Symbol Rate Ratio (SR%) = 100($f_Q/f_B$)
Bandwidth Reduction Efficiency (BRE%) = 2 × 100($f_B - f_Q$)/$f_B$ where:
$f_Q$ = quaternary symbol rate,
$f_B$ = binary bit rate.

It will be evident that for very large values of n, the SR approaches 50% and BRE approaches 100%. However, this is offset by the fact that the limiting value of the running digital sum also increases, thereby increasing the low frequency component of the transmitted signal. The following illustrates the results for n=6 and 8.

| n | 2nB/(n + 1)Q | SR % | BRE % |
|---|---|---|---|
| 6 | 12B/7Q | 58.3 | 83.3 |
| 8 | 16B/9Q | 56.3 | 87.5 |

Such a coding scheme provides a highly efficient yet simple form of transmission utilizing quaternary-level signals.

Figure 1:
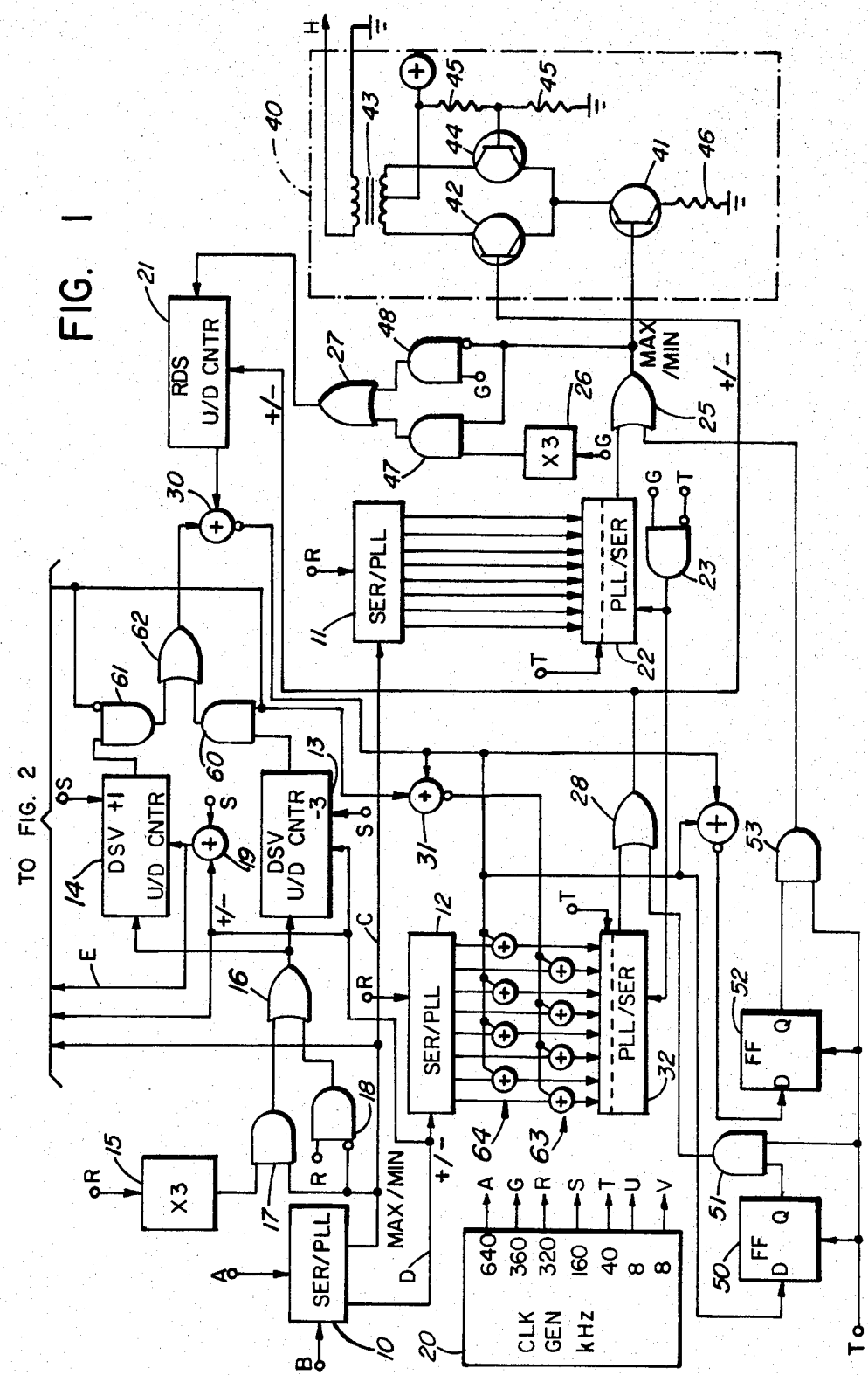
FIGS. 1 and 2 together illustrate a block and schematic diagram of an interleaved-block code converter for encoding binary signals into signals having multilevel symbols.
Figure 2:
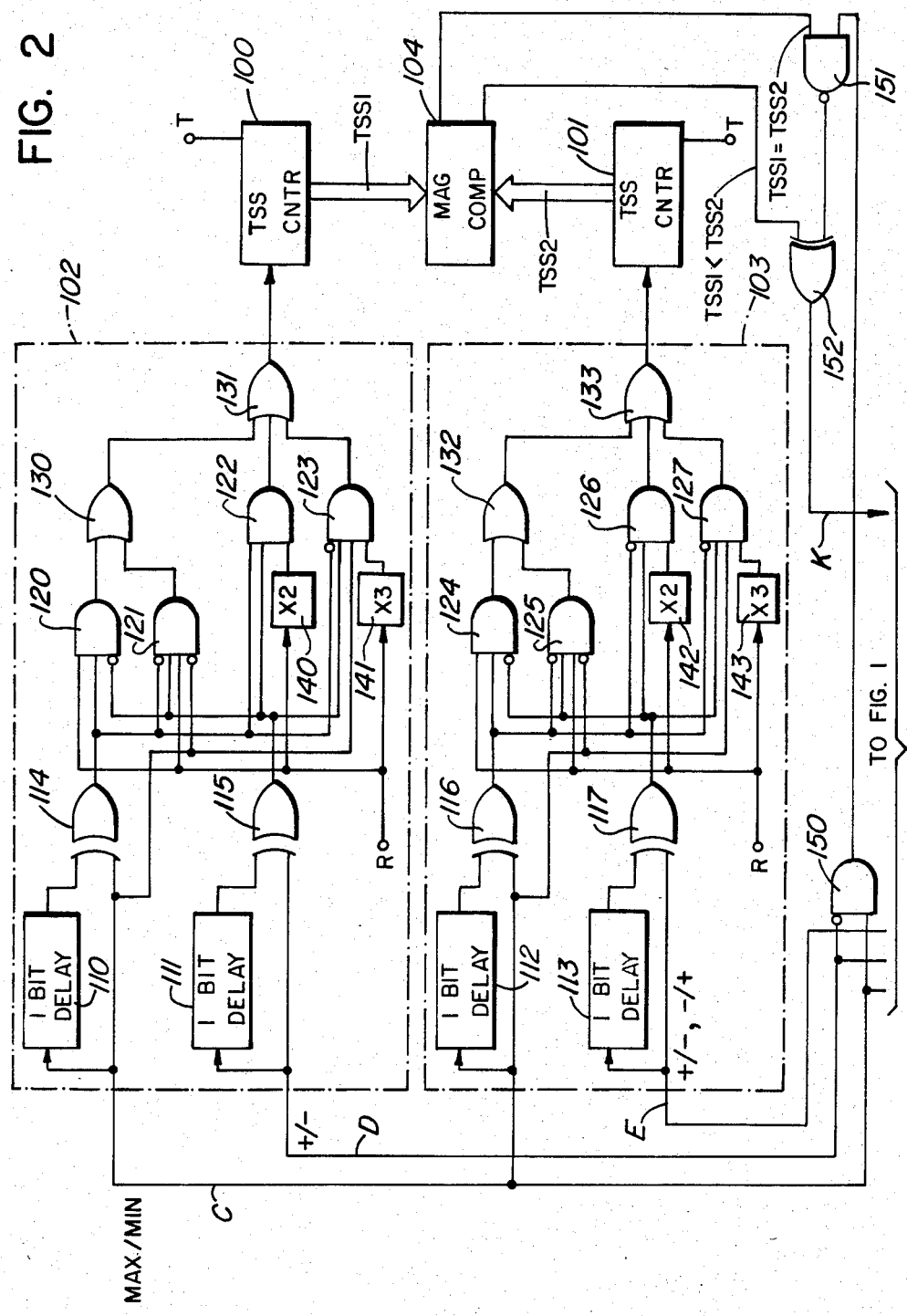
Figure 3:
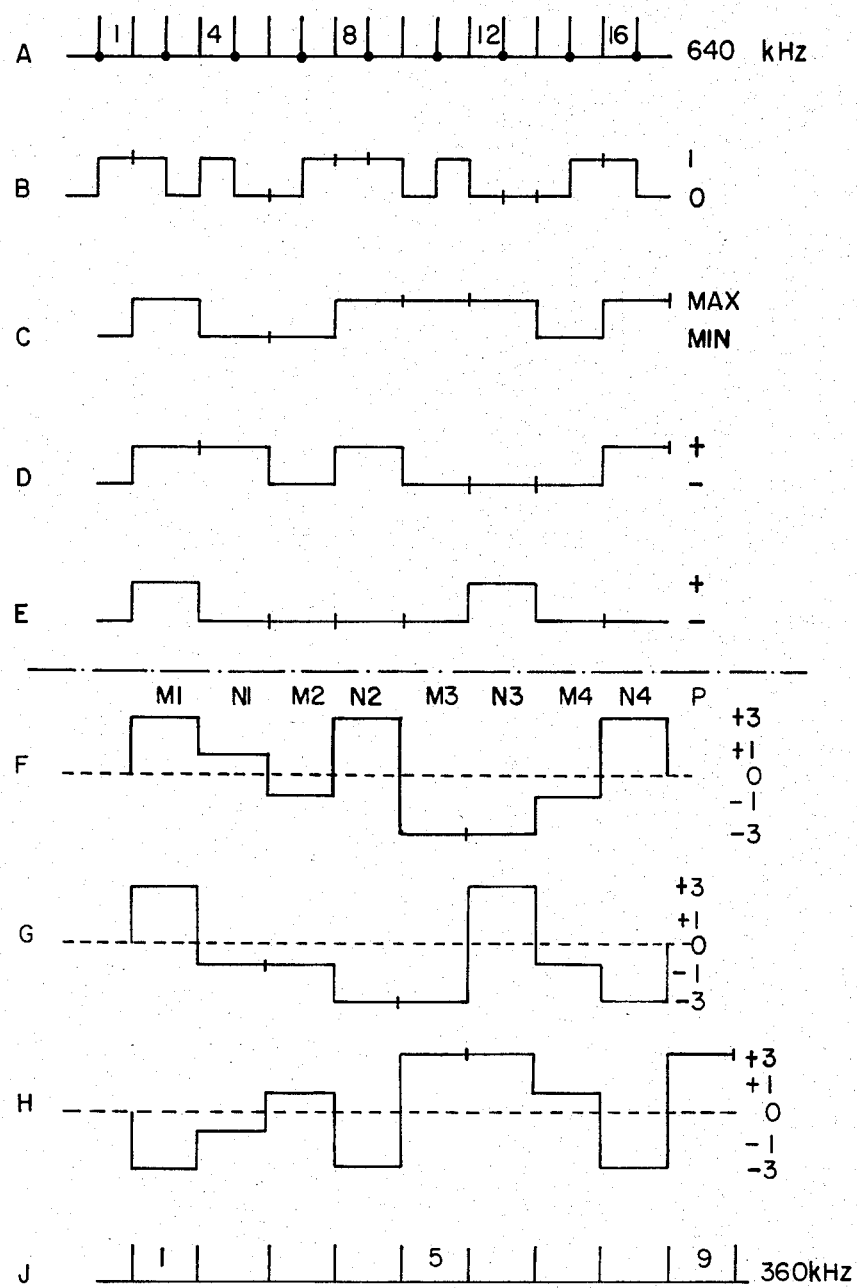
FIG. 3 illustrates typical waveforms in the interleaved-block code converter of FIGS. 1 and 2.

In this example embodiment of an interleaved-block coder, the location of the waveforms of FIG. 3 are identified by corresponding reference characters in FIGS. 1 and 2. In order to nore clearly illustrate the relationship between the various waveforms, the time frame of waveforms A, B, C, D and E has been slightly foreshortened relative to that of waveforms F, G, H and J so that the signals are vertically aligned. In real time, the period for the 16 intervals of waveform A would be equal to that of the 9 intervals of waveform J.

Also in this embodiment a value of n=8 has been selected. Referring to FIG. 3, each frame has 9 quaternary-level symbols H comprising two words M, N each of 4 interleaved symbols (i.e. M1, N1, M2---N4), plus an added 9th symbol P to indicate the selective inversion of the two words. A binary signal B of 2n=16 bits is converted to the two four-symbol words M, N. Thus FIG. 3 illustrates typical waveforms for one frame of the input signal.

Referring to FIGS. 1, 2 and 3, a 640 kb/s binary input signal B is connected to the input of a two-stage serial-to-parallel converter 10 which is driven by a clock signal A from a generator 20. In the code converter each pair of binary bits of the input signal B is converted to one quaternary-level symbol H. At the parallel output of the converter 10, the first binary bit C of each pair represents the magnitude (max/min) of the symbol while the second bit D identifies its polarity (+/−). Bits C and D are loaded into serial-to-parallel converters 11 and 12 respectively under control of a 320 kHz clock signal R from the generator 20.

The transition state sum (TSS, i.e. the summation of all the numerical values of the differences between adjacent symbol levels) is first determined by two transition state sum counters 100 and 101 in conjunction with two transition weighting and pulse generator circuits 102 and 103. The weighting circuit 102 is driven directly from the magnitude signal C and the polarity signal D. The weighting circuit 103 is also driven directly from the magnitude signal C. However every second polarity symbol of the signal D is inverted by a modulo-2 adder 19 which is under control of a 160 kHz signal S. As a result, the counter 101 determines the transition state sum of two interleaved words in which the symbols of one word are inverted relative to the other.

Both weighting circuits 102 and 103 are identical in structure, and function in a similar manner. In each circuit, both the magnitude and polarity signals C and D or E are coupled directly and through one bit delays 110, 111, 112, 113, to Exclusive-OR gates 114, 115, 116, 117. The gates generate a logic 1 whenever a change in magnitude and/or polarity of each input symbol occurs. The following logic circuitry comprising AND gates 120, 121, 122, 123, 124, 125, 126, 127, OR gates 130, 131, 132, 133 and x2 or x3 multipliers 140, 141, 142, 143, generate 0, 1, 2 or 3 pulses for a relative change in signal level. Thus the number of pulses generated for a level change in the four possible signal levels +3, +1, −1, −3, as indicated by the input signals C and D or E, is:

| LEVEL CHANGE TO | or FROM | NUMBER OF PULSES |
|---|---|---|
| +3 | +3 | 0 |
| +1 | +1 | 0 |
| −1 | −1 | 0 |
| −3 | −3 | 0 |
| +3 | +1 | 1 |
| +1 | −1 | 1 |
| −1 | −3 | 1 |
| +3 | −1 | 2 |
| +1 | −3 | 2 |
| +3 | −3 | 3 |

The output pulses for each word are accumulated and stored in the counters 100 and 101, and then compared in a magnitude comparator 104 at the end of each pair of words. The comparator 104 in turn generates a logic 1 signal at one of its two outputs whenever TSS1=TSS2 or TSS1<TSS2 as shown in FIG. 2. Since the timing of the TSS processor does not allow the value of the 9th symbol to be included, this must be accounted for separately. The coding rule for the 9th symbol is so arranged that there is only one condition for which the TSS decision is changed by the 9th symbol value. An AND gate 150 (which is responsive to the magnitude and polarity signals C and D) detects when the 9th symbol has a value of −3 and, on the occurrence of the condition TSS1=TSS2, acts together with a NAND gate 151 and an Exclusive-OR gate 152 to cause an inversion of the TSS decision. The output signal K indicates which of the combinations of inverted/non-inverted interleaved words has the larger TSS (including the effect of the 9th symbol).

The digital sum variation (DSV) of the interleaved words is determined by up/down counters 13 and 14. In each case this variation is obtained by counting input pulses, the number of which are controlled by the binary magnitude bits C. A maximum magnitude bit opens AND gate 17 to couple three pulses from the x3 multiplier 15 through an OR gate 16 to the input of the DSV counters 13 and 14. Conversely, a minimum magnitude bit connected to the inverted input of the AND gate 18, will result in a single pulse R being coupled through the OR gate 16 to the input of the counters 13 and 14. Concurrently, signal D (or one which has been inverted by the modulo-2 adder 19 to signal E) representing either a positive or negative polarity, is coupled to a second input of the counters 13 and 14. This causes the counters to count up or down respectively. The counters 13 and 14 are initialized to a value of −3 and +1 respectively at the beginning of each frame by a 160 kHz clock signal S, to compensate for the digital sum variation introduced by the additional ninth symbol which is added to each frame to identify the selective inversion of one or both words therein.

Referring again to FIG. 3, odd numbered binary bits of the input signal B which represent the magnitude of the quaternary-level symbol, are transformed to the magnitude signal C delayed by one bit. The even numbered bits of the input signal B are transformed to the polarity signal D or by inverting every second even numbered bit in the modulo-2 adder 19, the polarity signal E. These signals D or E can be utilized to control the generation of selectively inverted quaternary-level signals F or G respectively at the output H, having balanced signal levels of +3, +1, −1, and −3, and a maximum transition state sum. In signals F and G, it can be seen that the M symbols of both words have the same magnitude and polarity, while the interleaved N symbols have the same magnitude but opposite polarity. Selecting the signal based only on the maximum TSS provides significant spectral energy at the Nyquist rate. However there would still exist a large low-frequency component in the spectral energy of the transmitted signal. This can be eliminated by selectively inverting the entire frame to continually minimize the running digital sum (RDS) of the transmitted signal. In the present embodiment, this is achieved by selectively inverting the entire frame so that the residual digital sum variation is opposite in polarity to the previously accumulated running digital sum (RDS). This RDS is determined by an up/down counter 21 which functions in a manner similar to that of the counter 13.

The eight magnitude bits C from the converter 11 are loaded in parallel into the parallel-to-serial converter 22 under control of a 40 kHz clock signal T. The output from the converter 22 is driven by a 360 kHz clock signal G through an AND gate 23 which is interrupted every ninth pulse by the 40 kHz clock pulse T in order to insert the additional symbol. These magnitude bits are coupled through an OR gate 25 and are used to control one input of the RDS counter 21 through a x3 multiplier 26, AND gates 47, 48, driven by the 360 kHz signal G, and an OR gate 27 in a manner identical to that of the magnitude input to the DSV counter 13. The output of the OR gate 25 is also used to drive the magnitude input of a symbol generator 40. Concurrently, a polarity bit at the second input to the counter 21 is used to determine whether the counter counts up or down. However, unlike the DSV counter 13, the RDS counter 21 is not reset at the beginning of each word.

At the beginning of each frame the transition state sum counters 100 and 101 are both reset by the 40 kHz signal T. Utilizing the example signal of waveforms F and G at the end of the eight symbols of the frame, the transition state sum stored in the counters 100 and 101 is 10 and 9 respectively. These numbers are derived by accumulating a 1 for each change in level as described previously. The magnitude comparator 104 together with gates 150, 151 and 152 generate a logic 1 at K indicating that the signal F has a greater TSS than the signal G. This signal is utilized to select the output from one or the other of the counters 13 or 14 through AND gates 60 or 61 and OR gate 62. In the present case the output of counter 13 is selected and coupled to the modulo-2 adder 30 via gates 60 and 61.

The DSV counters 13 and 14 are initialized to a value of −3 and +1 respectively. At the end of the eight quaternary-level symbols, the digital sum variations stored in the counters 13 and 14 have values of −3+10−8=−1 and +1+6−12=−5 respectively. As described above, the DSV output from counter 14 is not selected in this example and is therefore ignored. Assuming the RDS currently stored in the counter 21 has a value of −4, the polarity outputs from the counters 13 and 31 will be logical 0 and 0 indicating both negative totals. This will produce a logical 1 at the inverted output of the modulo-2 adder 30. This output signal is fed directly to the four modulo-2 adders 63 and to one input of the modulo-2 adder 31. Since the output of the magnitude comparator 104 is also a logical 1, this produces a logical 1 at the inverted output of the adder 31 which is fed to the four modulo-2 adders 64. This results in both M and N words being inverted which is indicated by the inversion between signals F and the first 8 symbols of H.

The purpose of modulo-2 adder 31 is to selectively provide the additional inversion of the symbols of the word N to generate the maximum TSS as determined by the magnitude comparator 104. These polarity signals under control of the 80 kHz clock signal T are connected to the parallel-to-serial converter 32 the output of which is coupled to the OR gate 28 under control of the 360 kHz clock signal G from the AND gate 23. It will be evident that with binary notation, a positive or negative value must be assigned to the polarity signals at the outputs of the counters 13, 14, and 21 whenever the DSV or RDS is zero. In this embodiment, a stored count of zero results in a positive polarity signal at the respective outputs.

The magnitude and polarity signals from one frame are loaded into the RDS counter 21 at approximately the same time that the two words of the following frame are loaded into the DSV counters 13 and 14 which have again been initialized to −3 and +1 respectively at the beginning of this frame. The polarity bits from the two words M and N are coupled from the output of the converter 32 through the OR gate 28 to the polarity input of the RDS counter 21. Concurrently they are coupled to the polarity input of the symbol generator 40, at the same time the eight magnitude bits from the OR gate 25 are connected to the magnitude input.

The magnitude signal sets the controlling voltage on a voltage controlled current source comprised of a transistor 41 and resistor 46. A maximum magnitude signal causes a high level current to be provided to the differential switch comprising transistors 42 and 44. A minimum magnitude signal results in a low level current. A bias network 45 is set so that when the polarity signal is positive, transistor 42 is turned hard on and transistor 44 off, thereby causing an output of a positive polarity across the transformer 43. Conversely, when the polarity signal is negative, transistor 42 is cut off and transistor 44 is turned hard on thereby causing an output of negative polarity from the transformer 43. This results in an output signal H as shown in FIG. 3. Thus, the polarity of this output signal H is determined by the signal from the output of the OR gate 28, whereas its magnitude is determined by the signal from the OR gate 25.

There are four possible signal combinations of the two words M and N which can be transmitted. Both words M and N can be non-inverted as shown in waveform F; word M non-inverted and word N inverted as shown in waveform G; word M inverted and word N non-inverted which is equivalent to waveform G inverted; and both words M and N inverted which is equivalent to waveform F inverted. In this example, both words M and N of the frame were transmitted inverted (note the inversion of symbols of waveform H relative to that of waveform F). The selective inversion of the two words is indicated by a separate $(n+1)$th or 9th symbol which is added at the end of each frame. The counter in the DSV counter 13 is weighted by the initializing signals to compensate for the polarity and magnitude of this 9th symbol so that this symbol will not introduce a d-c component of its own. The relative magnitude and polarity of this separate symbol is:

| word M | word N | separate symbol magnitude/polarity |
|---|---|---|
| inverted | inverted | +3 |
| inverted | non-inverted | −1 |
| non-inverted | inverted | +1 |
| non-inverted | non-inverted | −3 |

The polarity of this 9th symbol pulse is obtained by storing the output from the modulo-2 adder 31 in a D-type flip-flop 50. At the end of each frame, the 40 kHz frame pulse T is used to trigger an AND gate 51 which couples the output of the flip-flop 50 to the OR gate 28 and thence to the generator 40. Concurrently, the parallel-to-serial converter 32 is inhibited by the frame pulse T which is connected to the inverted input of the AND gate 23.

The magnitude of the 9th symbol is obtained by coupling the outputs from modulo-2 adders 30 and 31 to modulo-2 adder 35 and then storing the inverted output from the latter in a D-type flip-flop 52. At the end of each frame, the 40 kHz frame pulse T also triggers an AND gate 53 which couples the output of the flip-flop 52 through the OR gate 25 to the magnitude input of the generator 40. Again, the output of the parallel-to-serial converter 22 is inhibited during this 9th symbol by the frame pulse T. With both words M and N being transmitted inverted, logical 1 signals are obtained at both the outputs of the gates 51 and 53. These signals are used to generate the 9th symbol which in the present case has a value of +3 as shown in waveform H.

Figure 4:
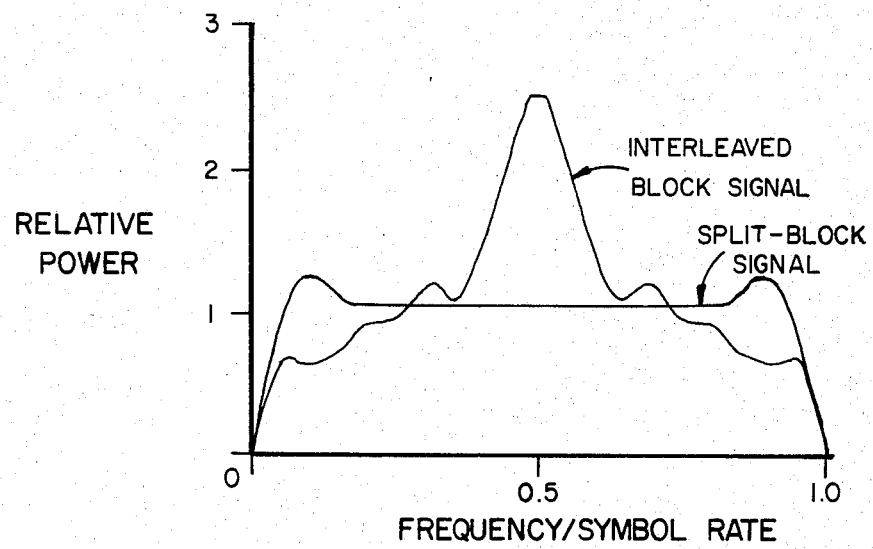
FIG. 4 illustrates a typical power spectral density generated by the interleaved-block code converter of FIGS. 1 and 2 as compared to that of the prior art.

FIG. 4 illustrates a typical power spectrum generated by the interleaved-block code converter of the present invention as compared to that of the split-block code converter described in the Betts et al patent. The decrease in the low frequency power spectral density and the increase at frequencies close to the Nyquist rate will be readily apparent.

What is claimed is:

1. A code converter comprising:
means for converting blocks of binary bits into words each having multilevel symbols, the words being grouped into frames having interleaved symbols from each of the words, each frame including an additional multilevel symbol;
a running digital sum counter for determining the running digital sum of the symbols of all prior frames;
a digital sum variation counter for determining the digital sum variation of the words of each frame;
means responsive to the running digital sum and the digital sum variation counter for selectively inverting an entire frame to minimize the accumulated running digital sum of the prior frames and the selected frame;
characterized by:
transition state sum counters for determining the transition state sum of adjacent symbols of the words;
means responsive to the transition state sum for selectively inverting each word relative to the other word so as to maximize the sum of the transition states between adjacent symbols of the words in each frame; and
means for utilizing the states of the additional multilevel symbol to indicate the selective inversion of the words relative to each other, and the selective inversion of the entire frame.

2. A code converter comprising:
means for converting blocks of binary bits into first and second words each having $n/2$ quaternary-level symbols, the words being grouped into frames having interleaved symbols from each of the words, each frame including an additional $(n+1)$th quaternary-level symbol;
a running digital sum counter for determining the running digital sum of the symbols of all prior frames;
digital sum variation counters for determining the digital sum variation of each word;
means responsive to the running digital sum and the digital sum variation counters for selectively inverting entire frames to minimize the accumulated running digital sum of the previously converted frames and the selected frame;
characterized by:
transition state sum counters for determining the transition state sum of adjacent symbols of the words;
responsive to the transition state sum for selectively inverting each word relative to the other words so as to maximize the sum of the transition states between adjacent symbols of the words in each frame; and
means for utilizing all four states of the $(n+1)$th quaternary-level symbol to indicate the selective inversion of the second word relative to the first word, and the selective inversion of the entire frame.

* * * * *